United States Patent

Mahn, Jr.

[11] Patent Number: 5,411,783
[45] Date of Patent: May 2, 1995

[54] HEAT ACTIVATED APPLIQUE WITH UPPER THERMOPLASTIC ELASTOMER LAYER

[75] Inventor: John Mahn, Jr., Cincinnati, Ohio

[73] Assignee: Specialty Adhesive Film Co., Cleves, Ohio

[21] Appl. No.: 187,218

[22] Filed: Jan. 27, 1994

Related U.S. Application Data

[63] Continuation-in-part of Ser. No. 123,570, Sep. 20, 1993, Pat. No. 5,364,688, which is a continuation-in-part of Ser. No. 27,954, Mar. 8, 1993, Pat. No. 5,380,391.

[51] Int. Cl.$^6$ .............................................. B32B 31/00
[52] U.S. Cl. ...................... 428/79; 428/349; 428/355; 428/200; 428/542.2; 428/187; 428/343; 428/347; 156/234; 156/239; 156/240
[58] Field of Search .............. 156/209, 230, 235, 240, 156/241, 234, 239; 428/79, 200, 355, 542.2, 913.3, 187, 914, 343, 347, 349

[56] References Cited

U.S. PATENT DOCUMENTS

| | | | |
|---|---|---|---|
| 3,607,526 | 9/1971 | Biegen | 156/235 X |
| 3,952,131 | 4/1976 | Sideman | 428/334 X |
| 3,956,552 | 5/1976 | Geary | 428/88 X |
| 3,959,555 | 5/1976 | Day | 428/349 X |
| 3,985,602 | 10/1976 | Stuart | 156/235 X |
| 4,021,591 | 5/1977 | Devries | 428/200 X |
| 4,037,008 | 7/1977 | Tugwell | 428/200 X |
| 4,269,885 | 5/1981 | Mahn | 428/216 X |
| 4,315,790 | 2/1982 | Rattee | 156/230 X |
| 4,390,387 | 6/1983 | Mahn | 428/90 X |
| 4,421,816 | 12/1983 | Arnold | 428/202 X |
| 4,556,588 | 12/1985 | Rockwood | 428/13 X |
| 4,610,904 | 9/1986 | Mahn, Sr. et al. | 428/79 X |
| 4,685,984 | 8/1987 | Powers | 156/155 X |
| 4,785,045 | 11/1988 | Yonekura | 524/528 X |
| 4,786,349 | 11/1988 | Mahn, Sr. | 156/234 X |
| 4,971,644 | 11/1990 | Mahn, Sr. et al. | 156/253 X |
| 5,120,383 | 7/1992 | Takei | 156/240 |
| 5,133,819 | 7/1992 | Croner | 156/230 X |
| 5,149,589 | 9/1992 | Naritomi | 428/412 X |
| 5,244,524 | 9/1993 | Yamane | 156/230 X |
| 5,338,603 | 8/1994 | Mahn, Sr. et al. | 428/349 |

FOREIGN PATENT DOCUMENTS

| | | | |
|---|---|---|---|
| 0329493 | 8/1989 | European Pat. Off. | |
| 3114828 | 5/1991 | Japan | 428/349 |
| 403243342 | 10/1991 | Japan | 428/343 |

*Primary Examiner*—David A. Simmons
*Assistant Examiner*—Charles Rainwater

[57] ABSTRACT

The heat activated applique for providing in particular numbers and letter for sports jerseys includes an upper colored thermoplastic elastomer layer bonded to a cloth substrate by a thermoplastic adhesive. Preferably, the thermoplastic elastomer is a polyurethane thermoplastic elastomer and the thermoplastic adhesive is a polyester-based thermoplastic adhesive. The applique is suitable for forming a letter on a letter to provide three-dimensional characteristics to an alpha-numeric character. The thermoplastic elastomer layer can be debossed to provide surface characteristics to the heat activated applique, either prior to or during application. This is also suitable for applying additional indicia in the form of sublimation dye heat transferred into the thermoplastic elastomer.

9 Claims, 1 Drawing Sheet

HEAT ACTIVATED APPLIQUE WITH UPPER THERMOPLASTIC ELASTOMER LAYER

RELATED APPLICATIONS

This application is a continuation-in-part of U.S. patent application Ser. No. 08/123,570, now U.S. Pat. No. 5,364,688, filed Sep. 20, 1993, entitled "Heat Activated Transfer for Elastomeric Materials" which, in turn, is a continuation-in-part of U.S. patent application Ser. No. 08/027,954, now U.S. Pat. No. 5,380,391, entitled "Heat Activated Transfer for Elastomeric Materials" filed Mar. 8, 1993.

BACKGROUND OF THE INVENTION

Heat activated transfers and appliques are used to apply a variety of different indicia onto a variety of different substrates. The particular indicia can be a company logo, a person's name, lettering or numerals on sports jerseys and the like, as well as purely ornamental logos such as licensed characters.

Particularly when applying these to a cloth substrate, there are a number of different critical criteria for a heat activated applique. The indicia or heat activated applique must not curl, either prior to application or subsequent to application. The feel of the heat activated applique, once applied to the substrate, must be very soft or it will be uncomfortable for the individual wearing the marked article. Shelf life is another critical feature. If the heat activated applique does not have a prolonged shelf, it will be commercially worthless. Also, particularly with letters and numerals, the material must be easily cut.

An increasingly popular manner of marking sports jerseys is to apply a first numeral or letter and then apply a second numeral or letter of a smaller size directly upon the first numeral or letter, providing a three dimensional appearance. This requires that the heat activated applique be bondable to itself. To provide for ease of application and flexibility, it is preferable that the heat activated applique be bondable to a heat activated applique which has already been applied to a cloth substrate. This greatly facilitates applying the applique upon the cloth substrate.

Finally, with any heat activated applique, it is preferable to reduce the possibility of human error in applying the applique. With most heat activated appliques, the heat activated applique is applied to the cloth substrate by applying heat and pressure over a period of time to activate the adhesive layer, causing it to penetrate into the cloth substrate, adhering the indicia to the substrate. With most heat activated appliques, other than those formed from a cloth layer or a thermoset upper layer, if for too long a period of time the applique will be destroyed. It will either bleed through the cloth or it will feather out, providing an unsightly appearance.

SUMMARY OF THE INVENTION

The present invention is premised on the realization that a heat activated laminate formed from a thermoplastic elastomer upper layer and a heat activated adhesive lower layer provides an excellent heat activated applique. The heat activated applique does not curl and can be easily cut. Further, this applique can be easily bonded to itself and is shelf stable. In short, it meets all the major requirements for a heat activated applique.

These heat activated appliques of the present invention are particularly suitable for use in forming lettering for athletic jerseys. Their soft hand feel does not cause discomfort to the wearer. Because they are formed from an elastomer, they stretch and exhibit memory. Further, these thermoplastic elastomers require no additional lubricants, waxes or plasticizers which can migrate out and interfere with adhesion. Further, the heat activated applique does not bleed into the cloth substrate or feather out, even after extremely prolonged application of elevated temperature and pressure.

The objects and advantages of the present invention will be further appreciated in light of the followed detailed description and drawings in which:

DETAILED DESCRIPTION

Figure 1:
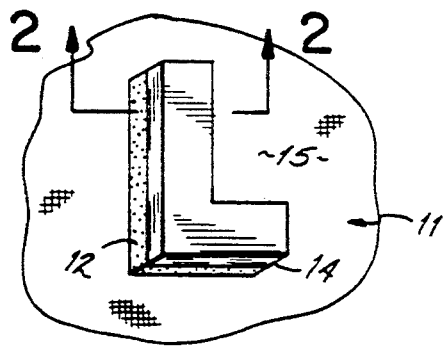
FIG. 1 is a perspective view of the present invention.

As shown in FIG. 1, heat activated applique 11 of the present invention includes a lower heat activated adhesive layer 12 and an upper thermoplastic elastomer layer 14. The heat activated adhesive layer 12 bonds the thermoplastic elastomer layer 14 to the cloth substrate 15.

The pigmented thermoplastic elastomer layer provides the indicia of the heat activated applique 11. Thermoplastic elastomers, also referred to as "elastoplastics," are elastomers which require no vulcanization or curing. Thermoplastic elastomers are materials which possess at normal temperatures the characteristic resilience and recovery from extension of crosslinked elastomers, but which exhibit plastic flow at elevated temperatures and can be fabricated by the usual techniques applied to thermoplastics. They are processed in standard plastic processing equipment. Particular thermoplastic elastomers include styrenic thermoplastic elastomer, polyolefin thermoplastic elastomer, thermoplastic polyurethane elastomer, including polyester urethane, polyether urethane and caproester-urethane, polyester thermoplastic elastomer, polyamide thermoplastic elastomer, thermoplastic polybutadiene, ethylene vinyl acetate copolymer thermoplastic, thermoplastic PVC/nitrile rubber, thermoplastic fluorocarbon elastomer, thermoplastic chlorinated polyethylene elastomer, and thermoplastic styrene butadiene rubber.

These are produced in a variety of different hardnesses. Generally, for use in the present invention, a softer grade of thermoplastic elastomer is required. Basically, the thermoplastic elastomer must have a flexibility at the applied thickness which is about the same as the cloth substrate to which it is bonded. Generally a durometer of 50-80 A or softer will suffice for use in the present invention, although a wide variety of materials can be used, depending upon the ultimate application. For example, lettering applied to a coat can be much more rigid and less flexible than lettering applied to a sports jersey.

Film thickness will also affect the overall feel of the heat activated applique of the present invention. The film thickness of the thermoplastic elastomer layer will vary from about 3 to about 15 mils, and preferably from about 5 to 7 mils, with about 5 mils being preferred.

The thermoplastic elastomer for use in the present invention should have a melting temperature of from about 250° F. up to 400° F. or higher, and preferably around 300° F. This, of course, will vary widely depending upon the particular application and in particular the adhesive used. If a lower melting point adhesive is used, a thermoplastic elastomer with a lower melting point can also be employed.

One particular thermoplastic elastomer which is particularly suitable for use in the present invention is Chemigum TPE 02055, manufactured by Goodyear Chemical. This is a PVC/nitrile-based thermoplastic elastomer having a melting temperature of about 300° F.

If desired, this can be combined with from about 5% to about 20% polyester thermoplastic resin or polyurethane thermoplastic resin to improve processing characteristics. However, for optimum hand feel, it is preferable to use the material by itself. This is pigmented by blending in about 3% by weight of a compatible pigment such as that sold by Americhem.

The lower layer is a compatible heat activated adhesive layer. Suitable thermoplastic adhesives for the present invention include polyester adhesives such as Emhart polyester thermoplastic adhesive, polyurethane adhesives such as Morton PS62, as well as mixtures of polyester and polyurethane thermoplastic adhesives or acrylic cross-linking adhesives such as Rohm & Haas Rhoplex LE 1126 or Rhoplex K87. Such adhesives are disclosed in U.S. Pat. Nos. 4,390,387, 4,269,885, 4,610,904, and 4,786,349.

A particularly useful adhesive for bonding onto nylon substrate is a linear saturated polyester polymer which includes a heat activated curing agent. One such adhesive is SAF-90 Film.

Generally, the adhesive must be compatible with both the substrate and the thermoplastic elastomer. Bostik brand polyester 4117 thermoplastic adhesive is particularly suitable for use in the present invention, and a suitable polyurethane adhesive is Morton PS62.

To form the heat activated applique of the present invention, the upper thermoplastic elastomer layer is simply laminated to the lower thermoplastic adhesive layer. The individual layers can be purchased at film thickness or extruded or calendared to the desired film thickness. These films are simply passed together through a laminator at about 350° F. to form the heat activated applique of the present invention. The laminated film can then be cut to provide the individual indicia, i.e., letter, numbers and/or emblems. These can then be applied to a cloth substrate by applying heat at about 350° F. and pressure of 20–30 psi against the upper thermoplastic elastomer layer toward the cloth substrate for about 5 to 10 seconds (preferably 6 seconds), causing the adhesive layer to soften, penetrate the cloth substrate and bond the thermoplastic elastomer layer to the cloth substrate. This is the embodiment shown in FIG. 1.

Figure 3:
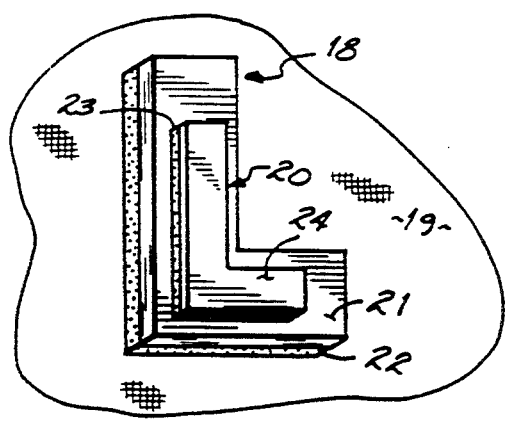
FIG. 3 is a perspective view of an alternate embodiment of the present invention.

FIG. 3 shows an alternate embodiment of the present invention in which an initial letter 18 is applied to a cloth substrate 19. Subsequently, a second letter 20 having a slightly smaller dimension than the first letter 18 is, in turn, bonded to the upper thermoplastic elastomer layer 21 of the first letter, i.e., both the first letter 18 and the second letter 20 are formed from the same constituents. The lower layers 22 and 23 are both polyester thermoplastic adhesive layers and the upper layers 21 and 24 are thermoplastic elastomer layers. The only difference is that the upper layer 24 is a different color than the upper layer 21 of letter 18.

To form the indicia shown in FIG. 3, the first letter 18 is simply applied to the cloth substrate 19 with heat and pressure sufficient to cause the thermoplastic layer 22 to bond to the cloth substrate. Subsequently, the upper letter 20 is placed upon the lower letter 18 and heat and pressure are applied sufficient to cause the thermoplastic adhesive layer 23 to soften and subsequently bond to layer 21 of the previously applied letter 18.

Figure 2:
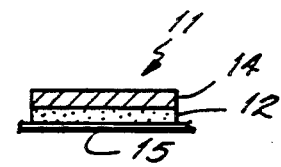
FIG. 2 is a cross-sectional view taken at line 22 of FIG. 1.
Figure 4:
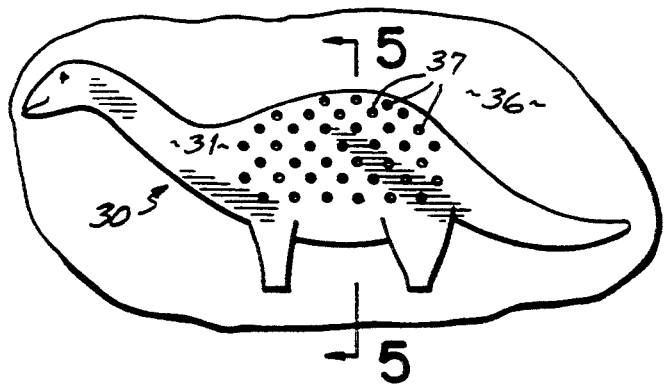
FIG. 4 is a top view of a second alternate embodiment of the present invention.
Figure 5:
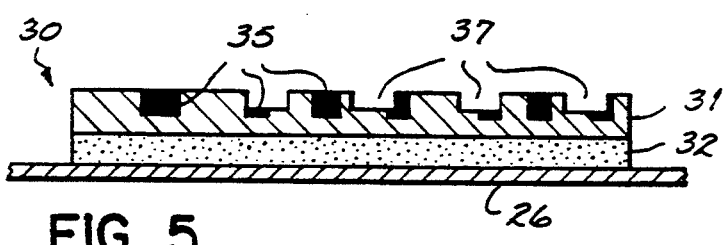
FIG. 5 is a cross-sectional view taken at line 55 of FIG. 4.

An alternate embodiment 30 is shown in FIGS. 4 and 5. In this embodiment, the upper layer 31 is a thermoplastic elastomeric layer having a film thickness of 2 to about 20 mils, preferably about 5 mils. This is bonded to a lower thermoplastic layer 32, preferably a polyester adhesive layer, Both the film thicknesses and chemical compositions of these layers are the same as the embodiment shown in FIGS. 1 and 2. In this embodiment, however, the thermoplastic elastomeric layer 31 is either clear or colored and is preferably colored and is marked in turn with indicia 35 which is a sublimation dye heat transferred into the surface of the elastomeric layer.

The applique 30 itself is heat bonded to a cloth substrate 36 as previously described. However, in this embodiment the heating iron preferably has an embossed surface which provides surface configuration to the applique. The applique shown in FIG. 3 has a plurality of debossed areas 37 throughout its surface. However, any surface configuration can be employed depending on the structure of the heating iron. The embodiments shown in FIG. 1 and FIG. 3 can also be debossed in this manner if desired.

The indicia 35 can be heat transferred to the upper elastomeric layer 31 either prior to bonding to the thermoplastic adhesive layer 32 subsequent to bonding to the thermoplastic adhesive layer and prior to being bonded to the cloth substrate 36 or can be applied at the same time the applique 30 is heat bonded to the elastomeric substrate. Likewise, the debossment or application of surface configuration can be made at any of these times. This provides a very unique heat activated applique which has significant dimensional configuration not normally present in heat activated appliques.

The use of the thermoplastic elastomer provides an extreme flexibility in producing and applying heat activated appliques. Due to the potential thickness of the elastomeric layer, the surface configuration can be fairly dramatic. Further, marking the thermoplastic elastomer with the sublimation dye provides an exceptionally durable and aesthetically appealing applique.

Thus, the present invention provides a variety of different means to provide indicia onto particular cloth substrates. One particular advantage of the present invention is that even when the individual applying the applique to the substrate applies the heat and pressure for an excessively long period of time, the thermoplastic elastomer tends to retain its shape and configuration and does not bleed into the cloth. Even when the duration of the heat and pressure is twice the desired duration, the indicia do not bleed into the cloth surface. This is important, not only in that it prevents the indicia from being ruined, but it also prevents the cloth substrate from being ruined. This, of course, can be much more expensive. Using a thermoplastic elastomer also provides excellent hand feel, stretch and recovery. This is accomplished without additives such as waxes or plasticizers which can interfere with adhesion. These combine to provide an excellent applique.

This has been a description of the present invention and, of course, the preferred embodiment of the present invention, as well as various alternate embodiments of the present invention, However, the invention itself should only be defined by the appended claims wherein I claim:

What is claimed is:

1. A heat activated applique comprising an upper thermoplastic elastomeric sheet providing indicia, said sheet having a lower surface bonded to a lower heat activated adhesive layer selected from the group consisting of thermoplastic adhesives and heat activated thermosettable adhesives wherein said applique is bonded to a cloth substrate by said heat activated adhesive layer.

2. The heat activated applique claimed in claim 1 wherein said thermoplastic elastomer layer is selected from the group consisting of styrenic thermoplastic elastomer, polyolefin thermoplastic elastomer, thermoplastic polyurethane elastomer, polyester thermoplastic elastomer, polyamide thermoplastic elastomer, thermoplastic polybutadiene, ethylene vinyl acetate copolymer thermoplastic, thermoplastic PVC/nitrile rubber, thermoplastic fluorocarbon elastomer, thermoplastic chlorinated polyethylene elastomer, and thermoplastic styrene butadiene rubber and blends.

3. The heat activated applique claimed in claim 2 wherein said thermoplastic elastomer layer has a Shore A hardness from 40 to about 80.

4. The applique claimed in claim 1 wherein said heat activated adhesive layer is selected from the group consisting of thermoplastic polyesters, thermoplastic polyurethane adhesives, heat activated cross-linkable linear saturated polyester adhesives and blends thereof.

5. The applique claimed in claim 4 wherein said adhesive is a thermoplastic polyester adhesive.

6. The heat activated applique claimed in claim 1 having a sublimation dye heat transferred into the upper surface of said thermoplastic elastomer sheet.

7. The heat activated applique claimed in claim 6 wherein said thermoplastic elastomer layer is debossed.

8. The heat activated applique claimed in claim 1 comprising a first alpha-numeric character and a second alpha-numeric character, wherein said first alpha-numeric character is bonded to a top surface of said second alpha-numeric character, wherein said first alpha-numeric character has a dimension slightly smaller than a dimension of said second alpha-numeric character.

9. The applique claimed in claim 1 wherein said indicia comprises a subimation dye heat transferred onto said thermoplastic elastomer sheet.

* * * * *